United States Patent
Wu et al.

(10) Patent No.: US 7,890,329 B2
(45) Date of Patent: Feb. 15, 2011

(54) APPARATUS AND METHOD TO REDUCE RECOGNITION ERRORS THROUGH CONTEXT RELATIONS AMONG DIALOGUE TURNS

(75) Inventors: Hsu-Chih Wu, Yi-Lan (TW); Ching-Hsien Lee, Kaohsiung (TW)

(73) Assignee: Industrial Technology Research Institute, Hsinchu (TW)

(*) Notice: Subject to any disclaimer, the term of this patent is extended or adjusted under 35 U.S.C. 154(b) by 867 days.

(21) Appl. No.: 11/831,960

(22) Filed: Aug. 1, 2007

(65) Prior Publication Data

US 2008/0215320 A1 Sep. 4, 2008

(30) Foreign Application Priority Data

Mar. 3, 2007 (TW) ................. 96107369 A

(51) Int. Cl.
*G10L 15/18* (2006.01)
(52) U.S. Cl. ............... 704/257; 704/232; 704/251; 704/9; 704/270; 704/231
(58) Field of Classification Search ............ 704/9, 704/257, 231, 232, 272, 275, 277, 270, 241, 704/251, 235, 3, 10, 237; 379/88.16; 705/27, 705/26; 715/810
See application file for complete search history.

(56) References Cited

U.S. PATENT DOCUMENTS

| | | | | |
|---|---|---|---|---|
| 5,546,522 A * | 8/1996 | Nishida et al. | ............ | 715/810 |
| 5,761,637 A * | 6/1998 | Chino | ............ | 704/231 |
| 6,044,347 A * | 3/2000 | Abella et al. | ............ | 704/272 |
| 6,052,441 A * | 4/2000 | Sato | ............ | 379/88.16 |
| 6,078,886 A * | 6/2000 | Dragosh et al. | ............ | 704/270 |
| 6,278,968 B1 * | 8/2001 | Franz et al. | ............ | 704/3 |
| 6,665,273 B1 | 12/2003 | Goguen et al. | | |
| 6,728,220 B2 | 4/2004 | Behzadi | | |
| 6,778,492 B2 | 8/2004 | Charny et al. | | |
| 6,804,645 B1 * | 10/2004 | Kleinschmidt | ............ | 704/243 |
| 6,920,420 B2 * | 7/2005 | Lin | ............ | 704/9 |
| 7,483,833 B2 * | 1/2009 | Peters | ............ | 704/270 |
| 7,516,076 B2 * | 4/2009 | Walker et al. | ............ | 704/275 |
| 7,610,556 B2 * | 10/2009 | Guo et al. | ............ | 715/745 |
| 7,640,458 B2 * | 12/2009 | Rao et al. | ............ | 714/38 |
| 7,729,918 B2 * | 6/2010 | Walker et al. | ............ | 704/275 |
| 2001/0002465 A1 * | 5/2001 | Delaunay et al. | ............ | 704/257 |
| 2002/0107690 A1 * | 8/2002 | Souvignier | ............ | 704/251 |
| 2002/0176371 A1 | 11/2002 | Behzadi | | |
| 2002/0176450 A1 | 11/2002 | Kong et al. | | |
| 2003/0046421 A1 * | 3/2003 | Horvitz et al. | ............ | 709/238 |
| 2003/0137537 A1 * | 7/2003 | Guo et al. | ............ | 345/751 |
| 2004/0081085 A1 | 4/2004 | De Cnodder et al. | | |

(Continued)

*Primary Examiner*—Vijay B Chawan

(57) ABSTRACT

Disclosed is directed an apparatus and method to reduce recognition errors through context relations among multiple dialogue turns. The apparatus includes a rule set storage unit having a rule set containing one or more rules, an evolutionary rule generation module connected to the rule storage unit, and a rule trigger unit connected to the rule storage unit. The rule set uses dialogue turn as a unit for the information described by each rule. The method analyzes a dialogue history through an evolutionary massive parallelism approach to get a rule set describing the context relation among dialogue turns. Based on the rule set and recognition result of an ASR system, it reevaluates the recognition result, and measures the confidence measure of the reevaluated recognition result. After each successful dialogue turn, the rule set is dynamically adapted.

19 Claims, 14 Drawing Sheets

U.S. PATENT DOCUMENTS

| | | | |
|---|---|---|---|
| 2005/0038659 A1* | 2/2005 | Helbing | 704/271 |
| 2005/0102142 A1* | 5/2005 | Soufflet et al. | 704/246 |
| 2005/0129059 A1 | 6/2005 | Jiang et al. | |
| 2006/0002423 A1 | 1/2006 | Rembert et al. | |
| 2006/0074671 A1* | 4/2006 | Farmaner et al. | 704/257 |
| 2006/0109802 A1 | 5/2006 | Zelig et al. | |
| 2006/0143007 A1* | 6/2006 | Koh et al. | 704/243 |
| 2007/0083366 A1* | 4/2007 | Peters | 704/235 |

* cited by examiner

S: "What are you doing tomorrow afternoon?"
U: "I am going to go swimming tomorrow afternoon."
S: "I do not like to go swimming."
U: "Do you like dancing?"
S: "I do not like to go dancing."
U: "Do you like shopping?"
S: "To go shopping is not bad but I prefer baseball television and movies."
U: "Would you like to join me the day after tomorrow in the afternoon to watch a movie?"
S: "No i am going to play football the day after tomorrow in the afternoon."
U: "To play football is not bad but I prefer dancing, swimming and shopping."
S: "Would you like to go shopping with me tomorrow morning?"
U: "No I am going to study tomorrow morning."
S: "To study is not bad but I prefer baseball television and movies."
U: "Would you like to join me the day after tomorrow in the morning to watch a movie?"
S: "Yes I would be delighted to watch movie with you."
U: "Okay let's get together to watch a movie the day after tomorrow in the morning."
S: "Good bye now."
U: "Good bye now."

FIG. 1 (Prior Art)

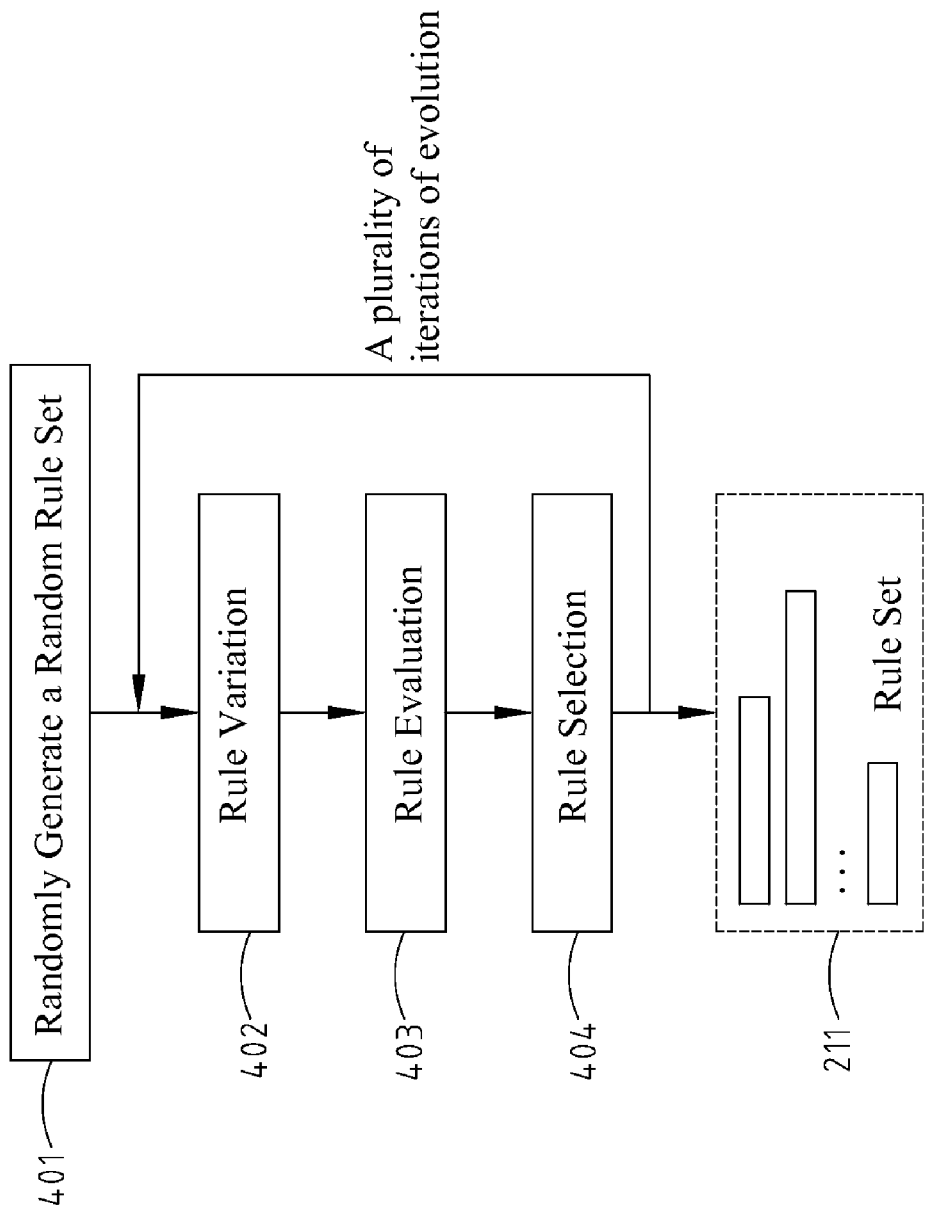

S: Descriptive Sentence Pattern
N: Descriptive Sentence Pattern, Negation Response
Y: Descriptive Sentence Pattern, Affirmative Response
N: Descriptive Sentence Pattern, Negation Direct Statement
Y: Descriptive Sentence Pattern, Affirmative Direct Statement
V: Inquiring Sentence Pattern
C: Clarification Sentence Pattern
X: Exiting Sentence Pattern
Q: Questioning Sentence Pattern

FIG. 5

| Dialogue Segment of Dialogue Log | Corresponding Context Type |
|---|---|
| U : "I am going to do nothing this evening." | S |
| S : "I am going to watch television this evening would you like to join me." | S |
| U : "I don't like to watch television." | n |
| S : "do you like baseball?" | V |
| U : "I don't like to play baseball." | n |
| S : "do you like tennis?" | V |
| U : "to play tennis is not bad but I prefer basketball, swimming, dancing and video games." | y |
| S : "would you like to join me tomorrow evening to play video games?" | V |
| U : "yes I would be delighted to play video games with you." | Y |
| S : "okay let's get together to play video games tomorrow evening." | V |
| U : "good bye now." | X |
| S : "good bye now." | X |
| U : "good bye now." | X |
| S : "do you like baseball?" | V |
| U : "I don't like to play baseball." | N |
| S : "do you like television?" | V |
| U : "yes I do like to watch television." | Y |
| S : "would you like to join me this afternoon to watch television?" | V |
| U : "no I am going to go dancing this afternoon" | N |
| S : "to go dancing is not bad but I prefer television, shopping, baseball and video games" | Y |
| U : "I am going to watch television the day after tomorrow in the morning would you like to join me" | S |
| S : "yes I would be delighted to watch television with you" | Y |
| U : "okay let's get together to watch television the day after tomorrow in the morning" | V |
| S : "good bye now" | X |

FIG. 8

| | |
|---|---|
| YV#X | X, 53 |
| #V## | S, 40 |
| #QC# | N, 20 |
| XQC# | Y, 19 |
| #QSy | V, 15 |
| ##YS | y, 12 |
| VYVN | y, 6 |
| SVN# | Q, 4 |
| SVNn | Q, 3 |
| N##N | S, 3 |
| Y##y | V, 3 |
| Vn#S | y, 2 |
| QSn# | N, 2 |
| N##V | X, 1 |
| N##Q | S, 1 |
| Q#Nn | n, 0 |
| #CnV | y, 0 |
| #Y#Y | S, 0 |
| #SnY | n, 0 |
| QQ## | N, 0 |
| CyNV | Y, 0 |
| SXXS | Q, 0 |
| YnSS | y, 0 |
| QnnX | N, 0 |
| CCSX | N, 0 |
| #XVC | V, 0 |
| yVyn | Q, 0 |
| SQNC | Q, 0 |
| YV#Q | n, 0 |
| QVCn | N, 0 |
| : | |
| : | |

FIG. 9A

| | |
|---|---|
| ##V# : V, 309 |
| ###V : Y, 208 |
| ##VX : X, 141 |
| #VY# : X, 106 |
| VYV# : X, 105 |
| V##X : X, 105 |
| #nV# : V, 96 |
| #V#V : Y, 90 |
| Y### : X, 89 |
| ###V : n, 72 |
| #y#Y : V, 66 |
| y#Y# : X, 62 |
| n##V : Y, 59 |
| ##yV : Y, 56 |
| #XX# : S, 55 |
| YV#X : X, 53 |
| #V#X : Q, 53 |
| #yVY : V, 52 |
| ##y# : N, 49 |
| yV#V : X, 48 |
| y### : V, 47 |
| #YV# : V, 44 |
| #QS# : V, 42 |
| #V## : n, 40 |
| #V## : n, 40 |
| Q##Y : V, 39 |
| ##n# : n, 38 |
| #Vy# : Y, 38 |
| ##V# : y, 38 |
| ##Y# : Y, 37 |
| ⋮ |

FIG. 9B

| |
|---|
| ##V# ∶ V, 309 |
| ###V ∶ Y, 208 |
| ###X ∶ X, 194 |
| #V## ∶ X, 159 |
| ##YV ∶ X, 142 |
| #Y#X ∶ X, 141 |
| #y## ∶ V, 108 |
| #VY# ∶ X, 106 |
| V### ∶ X, 105 |
| #nV# ∶ V, 96 |
| #V#V ∶ Y, 90 |
| Y### ∶ X, 89 |
| ###V ∶ n, 72 |
| #y#Y ∶ V, 66 |
| y#Y# ∶ X, 62 |
| y#YV ∶ X, 62 |
| n##V ∶ Y, 59 |
| YV## ∶ Q, 57 |
| ##yV ∶ Y, 56 |
| #XX# ∶ S, 55 |
| #V#X ∶ Q, 53 |
| YVX# ∶ X, 53 |
| #yVY ∶ V, 52 |
| V### ∶ Y, 52 |
| ##y# ∶ N, 49 |
| ###y ∶ Q, 48 |
| yV#V ∶ X, 48 |
| y### ∶ V, 47 |
| #### ∶ C, 47 |
| #YV# ∶ V, 44 |
| ⋮ |
| ⋮ |

FIG. 9C

| |
|---|
| #### : X, 336 |
| ##V# : V, 309 |
| #### : S, 285 |
| #### : Y, 243 |
| #### : y, 227 |
| ###V : Y, 208 |
| #### : Q, 203 |
| V### : V, 201 |
| ###X : X, 194 |
| #### : n, 189 |
| #V## : X, 159 |
| ###Q : S, 156 |
| ##Y# : X, 142 |
| #Y## : X, 141 |
| V#V# : V, 137 |
| ###V : y, 113 |
| #y## : V, 108 |
| #VYV : X, 106 |
| ###V : N, 105 |
| V### : X, 105 |
| #X## : S, 103 |
| #nV# : V, 96 |
| #V#V : Y, 90 |
| Y### : X, 89 |
| ###X : Q, 86 |
| Q### : V, 86 |
| ##X# : Q, 85 |
| #S## : V, 84 |
| YV## : X, 82 |
| V### : S, 80 |
| ⋮ |

FIG. 9D

APPARATUS AND METHOD TO REDUCE RECOGNITION ERRORS THROUGH CONTEXT RELATIONS AMONG DIALOGUE TURNS

FIELD OF THE INVENTION

The present invention generally relates to an apparatus and method to reduce recognition errors through context relations among dialogue turns.

BACKGROUND OF THE INVENTION

The reduction of recognition errors is an important issue in automatic speech recognition (ASR). The research shows that when more information is used for recognition reference, the recognition error rate can be effectively reduced. The applicable information includes speech utterance information, speech semantics information, and dialogue context relation information.

The conventional speech recognition technology uses keyword spotting. If the keywords are correctly spotted, the dialogue can be correctly continued to accomplish the task. For conventional information access dialogue systems, such as inquiry of weather, personnel information, ticketing and so on, the high recognition rate of keyword spotting and cooperation with other technologies, such as different dialogue subsystems for different dialogue states, can implement a functional and usable system.

In a more modern dialogue system, the relation between the system and the user is not as fixed as in the conventional systems, where one side asks and the other side answers. The more complicate interaction pattern results in that a usable dialogue system cannot be implemented simply by keyword spotting technology. For example, in a language learning system, the user and the system may interactively ask each other questions, and answer each other's questions to accomplish a task. FIG. 1 shows an exemplary dialogue in such a spoken dialogue system. As shown in FIG. 1, the user (U) and the system (S) uses dialogue to reach the agreement of a time and an activity for mutual participation.

In this example, the dialogue is not always one side asking and the other side answering. Therefore, the following recognition errors may occur:

"Do you like dancing?" may be erroneously recognized as "I do like dancing"; and "would you like to . . . ?" may be erroneously recognized as "What do you like to . . . ?"

In the above example, it is clear that keyword spotting technology may not be able to solve such problems since the system is too focused on keywords, such as "dancing" in above case. If the dialogue context information can be used in the speech recognition, the recognition rate may be greatly improved.

The current technologies include the use of historic dialogue content to improve the recognition rate. For example, Rebecca Jonson disclosed a "Dialogue Context-Based Re-ranking of ASR hypotheses" in IEEE SLT 2006. The technique is to use utterance feature, immediate context feature, the close-context feature, the dialogue context feature, and the possible list feature as the reference for determining the recognition error. The article uses only the contents of the two most recent dialogue turns as the basis for recognition.

Another technique to use historic dialogue content is to compute the related statistic information of the previous dialogue, such as the cancel percentage, error percentage, number of system turns, and number of user turns in the dialogue, without precisely and accurately using the related information of the dialogue content and without the accurate description of the possible relation between the dialogue turns.

The current techniques usually use the previous dialogue sentence (usually one from the system) as the basis for determining the current sentence. However, in actual dialogue, the current sentence may be related to a plurality of previous sentences, instead of relating to only the immediate previous sentence. The current technique may not effectively handle such situations. For example, the current example usually uses N-gram, and when n>3, the frequency distribution will be very sparse.

In a speech recognition system, the rescoring of N-best list to improve the recognition rate is also a widely applied concept. In rescoring of N-best list, the emphasis is to use some additional reference information to re-calculate the confidence measure of each item in the N-best list generated by ASR. The rescored N-best list is believed more reliable than original one, if the reference information is carefully chosen.

SUMMARY OF THE INVENTION

The present disclosure may provide an apparatus and method to reduce recognition errors through context relations among dialogue turns. In the present disclosure, it takes the context relations among one or more dialogue turns into account in searching for the best solution in recognition to reduce the recognition errors in ASR.

In the present disclosure, it analyzes the current dialogue contents, finds one or more rules describing the dialogue context relations, and uses those rules to form a rule set. The basic element in the rule representation is dialogue turn. Each rule describes the context relations among a plurality of dialogue turns. After training, the rule set is capable of evaluating a set of probability values, each representing the probability of a specific type of context information that current dialogue turn could be. The probability may be used to re-evaluate each item in N-best list generated by the ASR, making rescored N-best list more reasonable and accurate.

In an exemplary embodiment, the present disclosure is directed to an apparatus to reduce the recognition error through context relations among dialogue turns, the apparatus comprising: a rule storage unit, an evolutionary rule generation module, and a rule trigger unit. The rule storage unit includes a rule set consisting of one or more rules. Dialogue turns are used as basic elements in the rule representation. The evolutionary rule generation module performs an evolutionary adaptation process to train the rule set, using dialogue log (dialogue history) as training data. The rule trigger unit, based on the trained rule set and the dialogue history of a plurality of previous dialogue turns, triggers at least one rule to calculate corresponding confidence measures, and provides them to ASR system to evaluate or re-evaluate the N-best list of ASR result.

The reevaluated speech recognition results are fed back to the dialogue log. The apparatus may adjust the rule set through a reward/punishment element.

The present invention defines the attributes of the dialogue contents as one or more types, i.e., the dialogue context types. Each dialogue sentence may be classified to a specific dialogue context type. Each rule describes the information on a series of context types of previous dialogue turns, the context type of the current dialogue turn, and its confidence measure corresponding to the rule. In the rule representation, a universal type is defined to indicate any kind of dialogue context type.

In another exemplary embodiment, the present disclosure is directed to a method to reduce the recognition error through context relations among dialogue turns, the method comprising: using a massive parallelism evolutionary approach to analyze a dialogue historic log to train a rule set, the rule set describing context relations among one or more dialogue turns; based on the rule set and recognition result of an ASR system to reevaluate the recognition result, and measuring the confidence measure of the reevaluated recognition result; and dynamically adjusting the rule set for each successful dialogue turn.

The evolutionary massive parallelism approach may train the rule set according to the dialogue log. For example, a random rule set is generated. The random rule set is processed by three evolutionary computation operators, including rule variation, rule evaluation, and rule selection, for a plurality of iterations to obtain the trained rule set. After a plurality of iterations of adaptation, the rule set is capable of representing context relation among the dialogue turns.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 1 shows an exemplary dialogue in a spoken dialogue system.

FIG. 4 shows an exemplary evolutionary approach to train the rule set from the dialogue log, consistent with certain disclosed embodiments.

FIG. 5 shows an exemplary type definition by taking the dialogue log of FIG. 1 as an example.

FIG. 8 shows an exemplary mapping illustrating a dialogue and the corresponding types, consistent with certain disclosed embodiments.

FIG. 9A shows an exemplary rule set for dialogue log of FIG. 8 through random generating.

FIG. 9B-FIG. 9D show exemplary respectively trained rule set after 100, 200, 10000 iterations of evolution, each showing only first 30 rules of the set.

DETAILED DESCRIPTION OF THE PREFERRED EMBODIMENTS

Figure 2A:
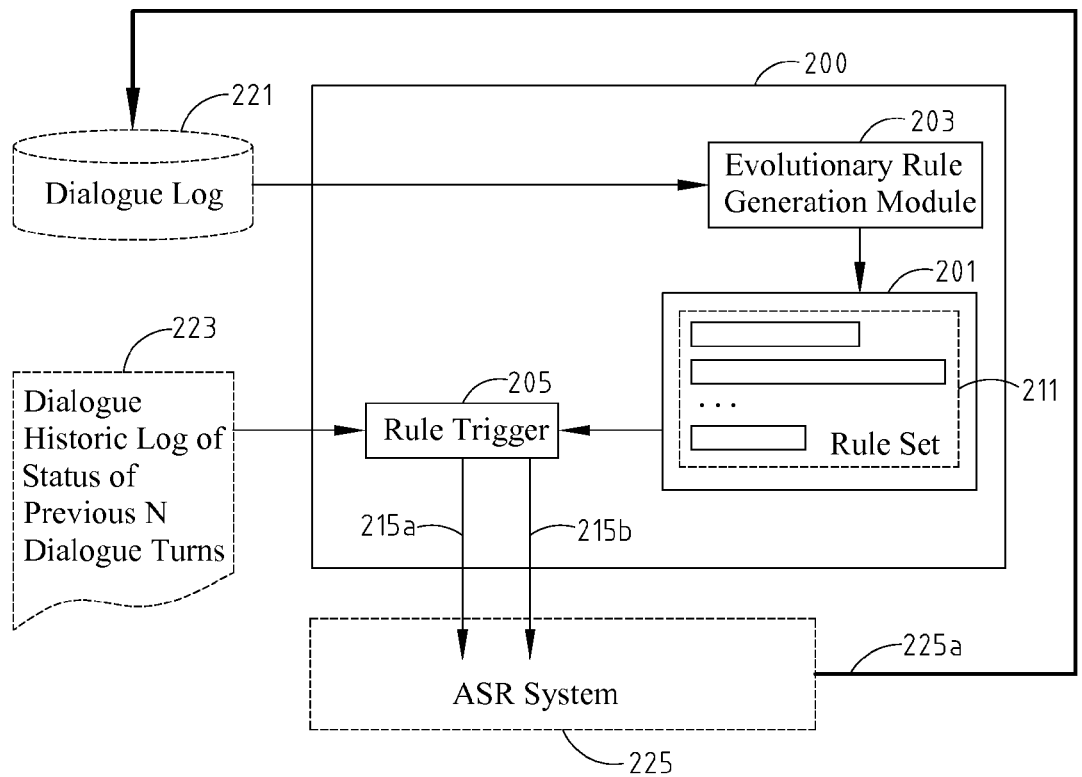
FIG. 2A is a block diagram of an exemplary apparatus to reduce recognition error through context relations among dialogue turns, consistent with certain disclosed embodiments.

FIG. 2A is a block diagram of an exemplary apparatus to reduce recognition error through context relations among dialogue turns, consistent with certain disclosed embodiments. Referring to FIG. 2A, the exemplary apparatus 200 comprises a rule storage unit 201, an evolutionary rule generation module 203, and a rule trigger unit 205. Rule storage unit 201 includes a rule set 211. Rule set 211 includes one or more rules. A dialogue turn is represented as a basic element in rule representation. Evolutionary rule generation module 203 is connected to rule storage unit 201. Evolutionary rule generation module 203 performs evolutionary adaptation from a dialogue log 221 to train rule set 211. Rule trigger unit 205 is connected to rule storage unit 201. Rule trigger 205, according to trained rule set 211 and dialogue history 223 of N previous dialogue turns, selects at least a rule 215a and corresponding confidence measure 215b from trained rule set 211 to provide an ASR system 225 for reevaluating the recognition result, where N is a natural number.

The reevaluated recognition result 225a is fed back to dialogue log 221. Apparatus 200 may further adjust rule set 211 through a reward/punishment element 237, as shown in FIG. 2B.

Figure 2B:
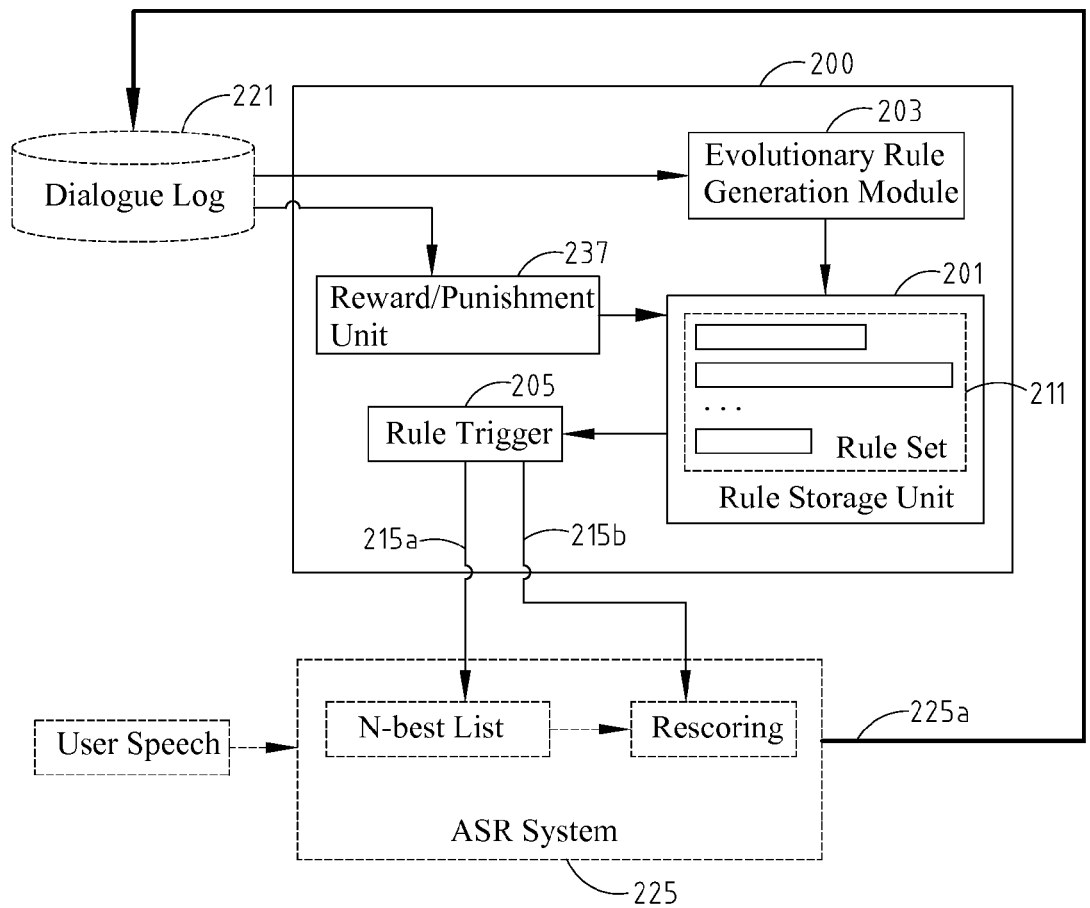
FIG. 2B is a diagram illustrating an ASR system using the exemplary apparatus of FIG. 2A to rescore, and the exemplary apparatus may adjust the rule set through a reward/punishment element.

Referring to FIG. 2B, when the user inputs speech into ASR system 225, ASR system 225 reevaluates the N-best list generated by ASR system 225, based on rule 215a and corresponding confidence measure 215b selected by rule trigger unit 205. The scores of the N-best list may be further weighted and the rescoring also takes the context information of dialogue turns into consideration. With this approach to reduce the recognition error, the confidence of the scoring of the N-best list is improved, and the best solution may be found from the N-best list and fed back to dialogue log 221. Rule set 211 may be further adjusted through reward/punishment element 237.

According to the present invention, evolutionary rule generation module 203 may train rule set 211 from an existing dialogue log. For example, a random rule set is generated, and trained by the three operation elements of the evolutionary rule generation module, including rule variation, rule evaluation and rule selection, to obtain rule set 211.

Accordingly, when applied to an ASR system, the apparatus consistent with the present invention takes the context relations among one or more dialogue turns, and trains into a plurality of rules describing the dialogue context relation, wherein the information described by each rule uses a dialogue turn as a unit. The trained rule set may be used to determine the probability of each context relation, based on the dialogue history. The probability is used to reevaluate the N-best list generated by ASR system to reduce recognition errors and improve the confidence of the recognition result of ASR system.

The information described by each rule of the rule set includes a series of context type of one or more previous dialogue turns, the context type of the current dialogue turn, and the confidence measure corresponding to that rule. The information described by each rule contains one or more context types. The confidence measure corresponding to the rule is a confidence score of the rule. In addition to the context types which present different types of dialogue turn information, a universal context type is defined to represent any kind of existing context type.

With reference to FIGS. 2A & 2B, the following describes the operation, the representation of the rule, and the definition of the described information for the present invention.

Figure 3:
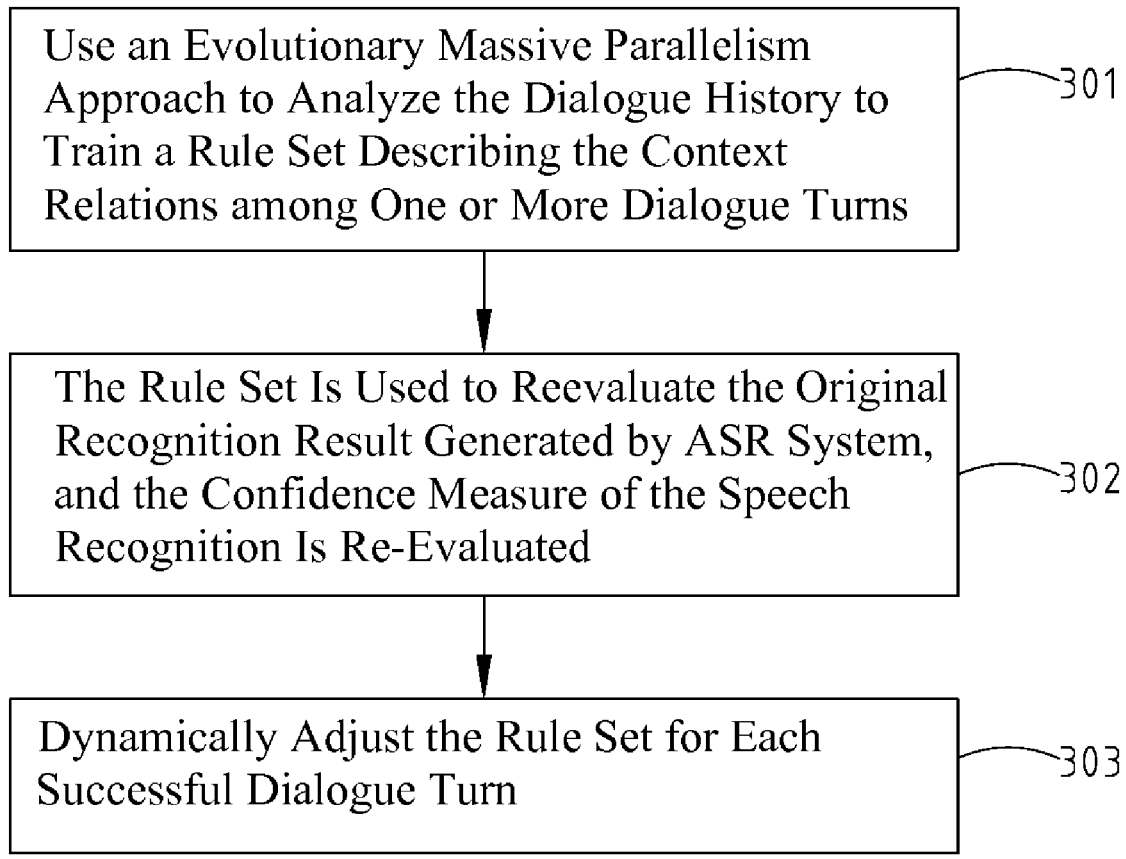
FIG. 3 is a flowchart illustrating an exemplary method to reduce recognition error through context relations among dialogue turns, consistent with certain disclosed embodiments.

FIG. 3 is a flowchart illustrating an exemplary method to reduce recognition error through context relations among dialogue turns, consistent with certain disclosed embodiments. Referring to FIG. 3, step 301 is to use an evolutionary massive parallelism approach to analyze the dialogue history to train a rule set. The rule set describes the context relations among one or more dialogue turns. The rule set is used to reevaluate the original recognition result generated by ASR system, and the confidence measure of the speech recognition is re-measured, as shown in step 302. Step 303 is to dynamically adjust the rule set for each successful dialogue turn. The following describes steps 301-303 in more details.

In step 301, the massive parallelism approach trains the rule set from the dialogue log. As shown in FIG. 4, a random rule set is randomly generated, as shown in step 401. Through the three operations of evolutionary approach, including rule variation 402, rule evaluation 403 and rule selection 404, the random rule set is trained to become rule set 211 after a plurality of iterations.

The rule set includes one or more rules, and each rule is represented with the dialogue turn as basic element. One or more types are defined for the context attributes, i.e., context type. Each dialogue sentence, according to the information, may be attributed to a specific context type. A rule may be represented as $M_1M_2M_3 \ldots M_n$:R,I, where $M_1M_2M_3 \ldots M_n$ represents the context types of n previous dialogue turns, 'R' is the context type of the current dialogue turn, and 'I' is the corresponding confidence measure. 'I' may be the evaluated scores of the rule, or the number of appearances or probability of the rule.

FIG. 5 shows an exemplary type definition by taking the dialogue log of FIG. 1 as an example. For example, dialogue "I do not like to go swimming." is defined as n type, dialogue "Do you like dancing?" is defined as V type, and dialogue "Good bye now." is defined as X type.

It is worth noting that the context type definition is not limited to the above 9 types. More context types may be defined according to the dialogue sentence patterns.

In the representation of the rule, in addition to the context type of each dialogue turns, the present invention also provides a universal type, marked as #. In $M_1M_2M_3 \ldots M_n$, if any dialogue turn uses the type #, it indicates that dialogue turn may be any type. For example, if the possible types include {V, Y, N, Q, S}, and the rule measure is 50, the # in "VY#N: S, 50" may be any type. In other words, "VYVN: S, 50", "VYYN: S, 50", "VYNN: S, 50", "VYQN: S, 50", and "VYSN: S, 50" all match the description of the rule.

The rules going through the three operations of evolutionary rule generation module to perform the rule evolution will have a higher confidence measure. In other words, each rule of the rule set may present the context relation among the dialogue turns. It is worth noting that the context relation is not restricted by the number of the dialogue turns. The following describes the three operation elements of the evolutionary rule generation module, including rule variation 402, rule evaluation 403 and rule selection 404.

Rule variation 402: In the rule set, each rule has a probability to vary or combine other rules. The variation manner may be the variation of dialogue context type, such as, from Mi to Mj, from Mi to #, from # to Mj, or the variation of the rule result, such as from R to R', where Mi, Mj, R, and R' represent different dialogue context types. For example, VS#Q can be varied to VS##. The variation by combination is to combine parts of different rules into a new rule. For example, VS## and ##SQ may be combined into VSSQ.

Rule evaluation 403: The confidence measure 'I' of the rule may be determined by the number of appearances or the probability that the rule appears in the dialogue log. For example, the more appearances of the rule, the higher the measure is.

Figure 6:
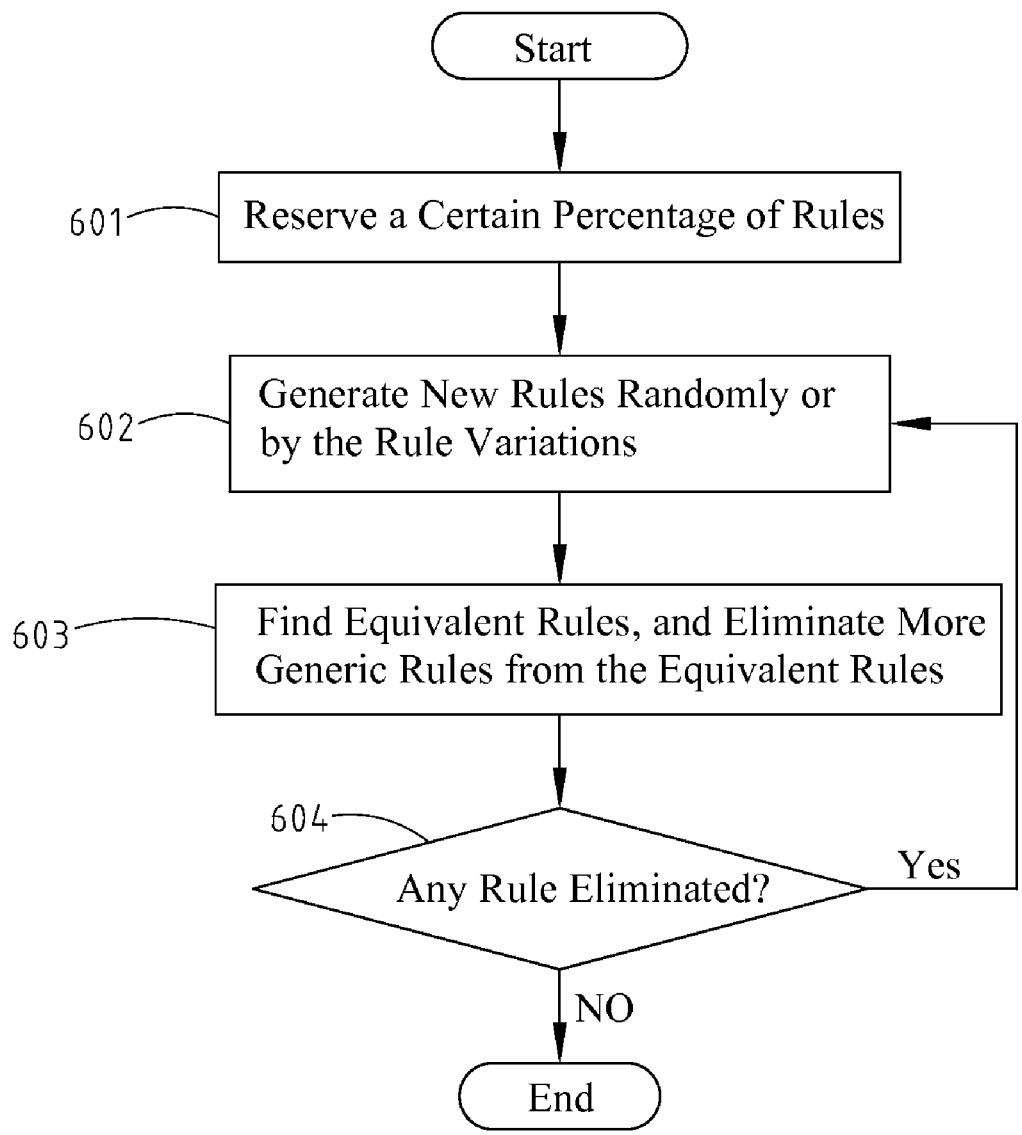
FIG. 6 is a flowchart illustrating an exemplary rule selection, consistent with certain disclosed embodiments.

Rule selection 404: FIG. 6 is a flowchart illustrating an exemplary rule selection, consistent with certain disclosed embodiments. Step 601 is to reserve a certain percentage of the rules, for example, 300 rules. The probability of a rule that is reserved is proportional to the confidence measure. Step 602 is to generate new rules randomly or by the rule variations. Step 603 is to find the equivalent rules, and eliminate the more generic rules from the equivalent rules. For example, if rule VS#:R and rule VS##:R have the same score, the two rules are viewed as equivalent rules, and the more generic rule (VS##:R) is eliminated. For another example, if two similar rules $M_iM_j\#M_1:M_r,23$ and $M_iM_jM_mM_1:M_r,23$ have the same score, the two rules actually describe the same situation. That is, the # in $M_iM_j\#M_1:M_r,23$ may only be $M_m$. The present invention may eliminate the rule $M_iM_j\#M_1:M_r,23$ to improve the correctness of the rule description.

Step 604 is to return to step 602 if any rule is eliminated; otherwise, the process stops.

The rule set evolved from a plurality of iterations of training, the scores will be higher, and the entire rule set may further represent the context relation among the dialogue turns. Therefore, the rule set may be used to compute the probability of the dialogue context types in the recognized dialogue so far. This information may be used to rescore the N-best list to improve the confidence measure of the recognition result.

Figure 7:
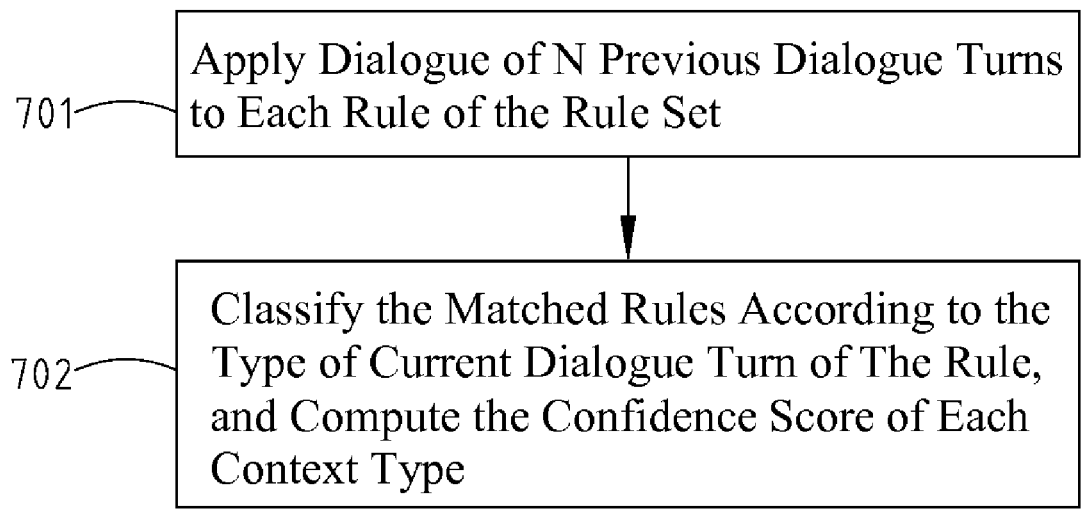
FIG. 7 shows an exemplary rescoring processing for each type of the current dialogue turn, consistent with certain disclosed embodiments.

After training the rule set, in step 302, the present invention further includes the following steps for rescoring and measuring the probability of the dialogue context type of the current dialogue turn. As shown in FIG. 7, step 701 is to apply the previous n dialogue log to the rules of the rule set one by one. That is to find the rule that has the types of the previous n dialogue turns $(M_1M_2M_3 \ldots M_n)$ matching the n previous dialogue log.

In step 702, all the matching rules are classified by the dialogue context type of the current dialogue turn, i.e., R, in the rule, and the confidence measure is computed for each context type. The confidence measure is computed as the sum of the confidence measure of all the rules that have the type as the result and match the n previous dialogue log. According to the confidence measure of each type, the probability of the type can be determined. The higher the confidence measure is, the higher the probability is.

Through inputting the confidence measure into the ASR system, the recognition error rate may be reduced in two ways. The first is to provide the confidence measure to the ASR system so that the ASR system can use the information to generate more accurate N-best list. The other is to act as the post-processing of the ASR system by adjusting the scores of the original N-best list with the confidence measure information or high probability rules to improve the recognition rate.

In step 303, the recognition result from ASR system is fed back to dialogue log, and the rules of the rule set are dynamically adjusted through the reward/punishment unit 237.

The following describes the operation of the present invention by using a dialogue in the dialogue log and the dialogue context type definition of FIG. 5. Without the loss of generality, the rules representation of this embodiment uses the dialogue context type of previous four dialogue turns for description. In other words, each rule is represented as $M_1M_2M_3M_4$:R,I.

FIG. 8 shows an exemplary mapping illustrating the above dialogue and the corresponding types, consistent with certain disclosed embodiments, where 'U' is the user and 'S' is an ASR system.

After receiving the dialogue log of FIG. 8, FIG. 9A-FIG.9D show an exemplary generation of rule set by the evolutionary massive parallelism approach. FIG. 9A shows an exemplary rule set for dialogue log of FIG. 8 through random generating. FIG. 9B-FIG. 9D show exemplary respective trained rule set after 100, 200, 10000 iterations of evolution. All lists show only the first 30 rules of the rule set consisting of 300 rules.

Figure 10:
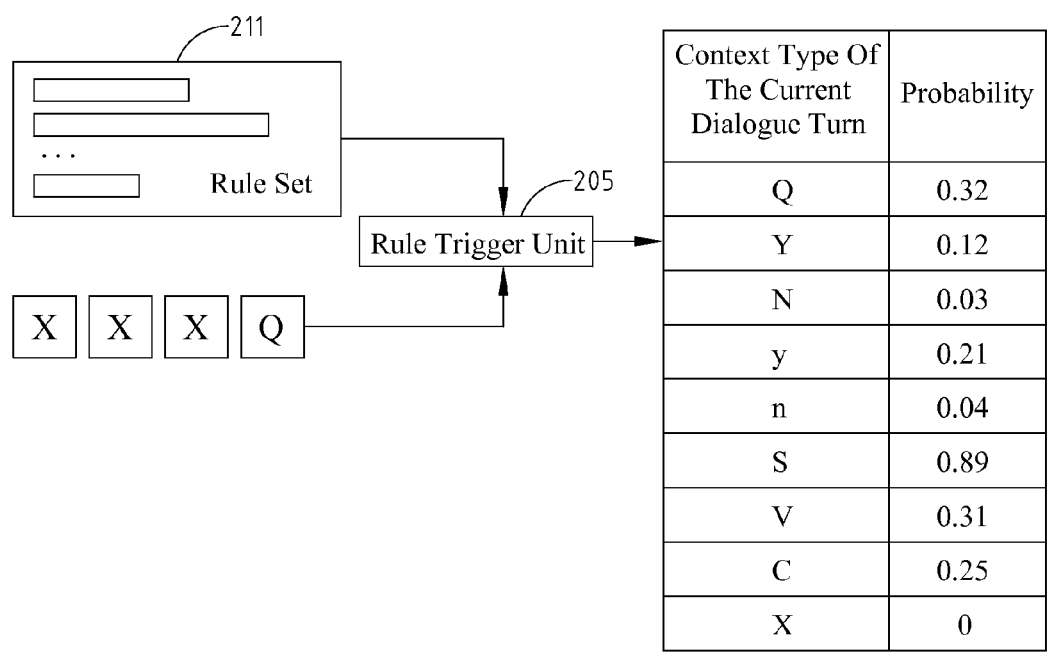
FIG. 10 is a diagram of an exemplary rule triggering by applying dialogue historic log to the rule set, and resultant probability for each type of the current dialogue turn.

The next step is to apply the dialogue historic log to each rule of the rule set of FIG. 9D, and analyze the confidence measure and the probability of each type of the current dialogue turn, as shown in FIG. 10.

Through rule trigger unit 205, the dialogue historic log of previous 4 dialogue turns are applied to each rule of the rule set, and the types of the previous 4 dialogue turns are found, i.e., $M_1M_2M_3M_4$. In this example, the $M_1M_2M_3M_4$ of a matching rule is XXXQ. According to the type of the current dialogue turn, i.e., R, of the type XXXQ for classification, and the score or probability of each type of the current dialogue turn is computed.

In this example, the probability is computed for the 9 types defined in FIG. 5. As shown in FIG. 10, type "Q" has the probability 0.32, the probability of type "Y" is 0.12, the probability of type "N" is 0.03, the probability of type "y" is 0.21, the probability of type "n" is 0.04, the probability of type "S" is 0.89, the probability of type "V" is 0.31, the probability of type "C" is 0.25, and the probability of type "X" is 0.

Because the probability of type "S" is the highest, the rule XXXQ:S has the highest probability. In other words, the system should answer in a direct statement.

Finally, a weighted sum of the rule XXXQ:S and the original N-best list of the ASR system may be used to find the moist suitable answer from the N-best list, such as "I did nothing yesterday morning" to increase the reliability of N-best list's confidence measure. Of course, the rule XXXQ:S may also be used in the post-processing in the ASR system. That is, the confidence measure of the N-best list may be directly adjusted to increase the accuracy rate of recognition.

The weighted sum of the trained rule set of the present invention and the scores of the original N-best list of the ASR system takes the context relation among the dialogue turns into account. With such a relation, the reliability for the confidence measure of the N-best list and the recognition precision may be further increased. In the mean time, the adaptive learning of the present invention has a lower training cost, which may be used in designing an ASR system with dynamical adjustment of the recognition rule. Such a mechanism may also be used in new generation or more complicated dialogue systems.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the true scope of the invention as defined in the appended claims.

What is claimed is:

1. An apparatus to reduce recognition error through context relation among dialogue turns, comprising:
   a rule storage unit having a rule set containing one or more rules, each rule being represented with the dialogue turn as basic element;
   an evolutionary rule generation module connected to said rule storage unit, for training said rule set by performing an evolutionary adaptation on a dialogue log to obtain a trained rule set; and
   a rule trigger unit connected to said rule storage unit, based on said trained rule set and the dialogue history of a plurality of previous dialogue turns, said rule trigger unit selecting at least a rule and the corresponding confidence measure from said trained set for providing an automatic speech recognition system to reevaluate the speech recognition.

2. The apparatus as claimed in claim 1, wherein said reevaluation result is fed back to said dialogue log, and said apparatus adjusts said rule set through a reward/punishment unit.

3. The apparatus as claimed in claim 1, wherein each rule of said rule set describes at least the context relation of said dialogue turn.

4. The apparatus as claimed in claim 1, wherein the information described by each rule of said rule set includes a series of context types of previous dialogue turns, the context type of the current dialogue turn, and the corresponding confidence measure of said rule.

5. The apparatus as claimed in claim 4, wherein said information described by said rule of said rule set has one or more context types.

6. The apparatus as claimed in claim 5, wherein said rule set provides a universal context type, and said universal context type represents any one type of said one or more context types.

7. The apparatus as claimed in claim 4, wherein said confidence measure of said rule is the confidence score of said rule.

8. The apparatus as claimed in claim 1, wherein said evolutionary rule generation module has three operation elements, including rule variation, rule evaluation and rule selection.

9. A method to reduce recognition error through context relation among dialogue turns, said method comprising:
   analyzing a dialogue historic log to train a rule set through a massive parallelism evolutionary approach, said rule set describing context relations among one or more dialogue turns;
   reevaluating said recognition result, and measuring the confidence measure of said reevaluated recognition result based on said rule set and recognition result of an automatic speech recognition (ASR) system; and
   dynamically adjusting said rule set for each successful dialogue turn.

10. The method as claimed in claim 9, wherein said training said rule set step further includes:
    randomly generating a rule set;
    training said random rule set through operations of rule variation, rule evaluation and rule selection of an evolutionary approach, for a plurality of iterations of evolution to obtain a trained rule set.

11. The method as claimed in claim 10, wherein said rule variation is that each rule of said rule set has a probability to become a new rule through variation or combination.

12. The method as claimed in claim 10, wherein said rule evaluation is the evaluation of the confidence measure for each rule of said rule set.

13. The method as claimed in claim 10, wherein said rule selection further includes:
    reserving a certain percentage of rules;
    generating new rules randomly or through said rule variation among existing rules;
    finding equivalent rules and eliminating more generic rules from said equivalent rules; and
    returning to said new rule generation step if one of said rules being eliminated.

14. The method as claimed in claim 9, wherein said rule set contains one or more rules, and the information described by each said rule uses dialogue turn as a unit.

15. The method as claimed in claim 14, wherein said rule set uses the following steps to describe the context relation among one or more dialogue turns:
defining one ore more context types for the attributes of the dialogue context of the one or more dialogue turns; and
representing each said rule as $M_1M_2M_3 \ldots M_n:R,I$, wherein $M_1M_2M_3 \ldots M_n$ represents the context type of previous n dialogue turns, 'R' represents the context type of the current dialogue turn, and 'I' represents the confidence measure corresponding to said rule.

16. The method as claimed in claim 9, wherein said reevaluation step further includes:
applying a dialogue log of a plurality of dialogue turns to each rule of said rule set to find rules having context types of previous dialogue turns matching said dialogue log; and
classifying said matched rules according to the type of said current dialogue turn of said rule, and computing the confidence measure score of each said context type.

17. The method as claimed in claim 16, wherein said confidence score is provided to said ASR system after said dynamic adjustment of said rule set.

18. The method as claimed in claim 17, wherein said confidence score allows said ASR system to generate an accurate N-best list.

19. The method as claimed in claim 17, wherein said confidence score is provided to said ASR system for post-processing to adjust the scores of the original N-best list.

* * * * *